No. 850,436. PATENTED APR. 16, 1907.
VAN BUREN LAMB.
BRAKE.
APPLICATION FILED MAY 26, 1906.
2 SHEETS—SHEET 1.
Fig. 1.
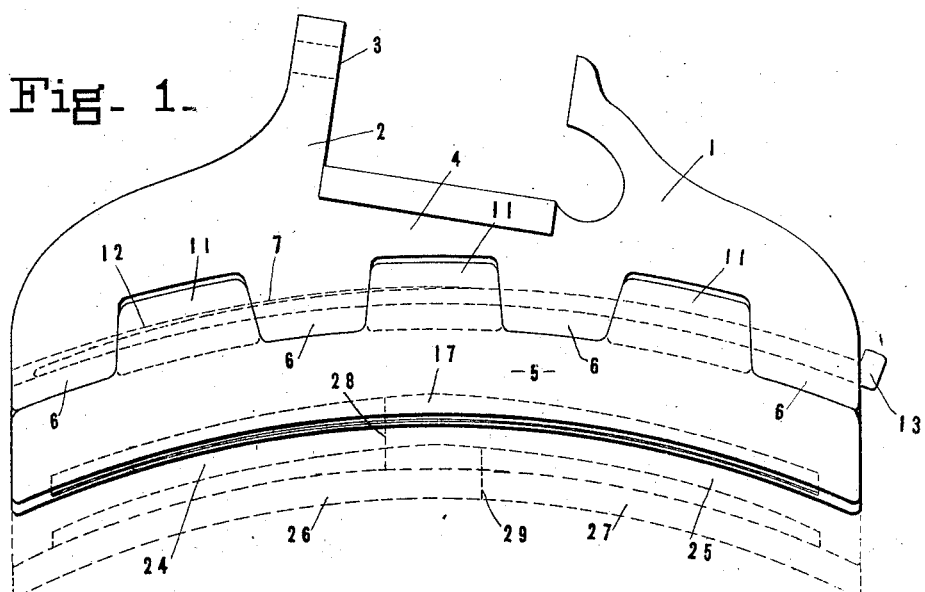
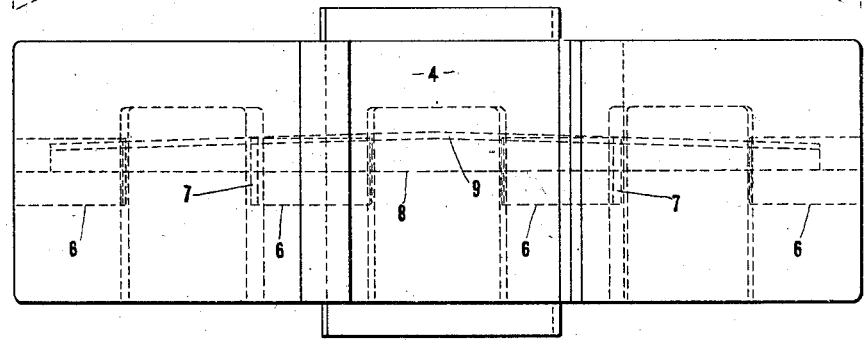
Fig. 2.
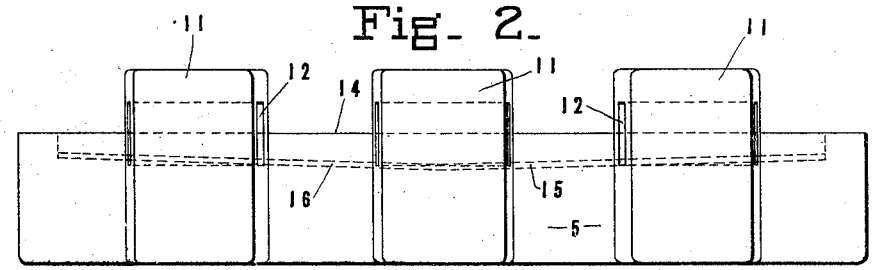
Fig. 3.
WITNESSES:
INVENTOR
Van Buren Lamb
BY
Warfield & Duell
ATTORNEYS No. 850,436. PATENTED APR. 16, 1907.
VAN BUREN LAMB.
BRAKE.
APPLICATION FILED MAY 26, 1906.
2 SHEETS—SHEET 2.
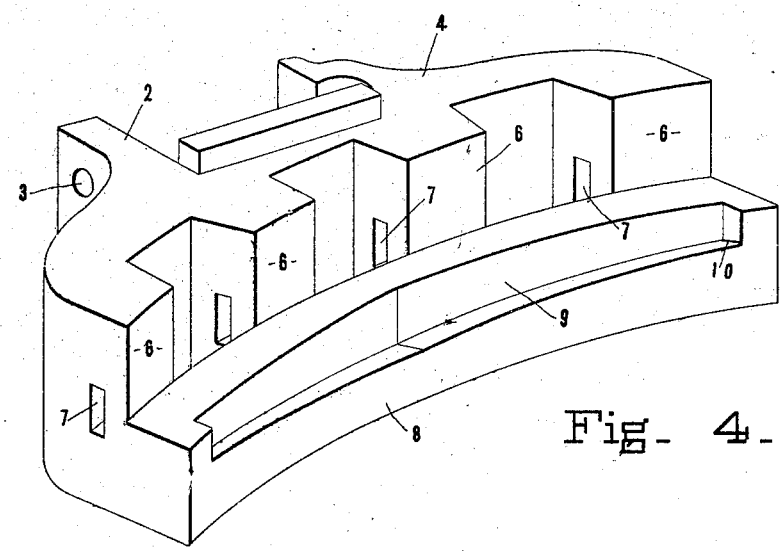
Fig. 4.
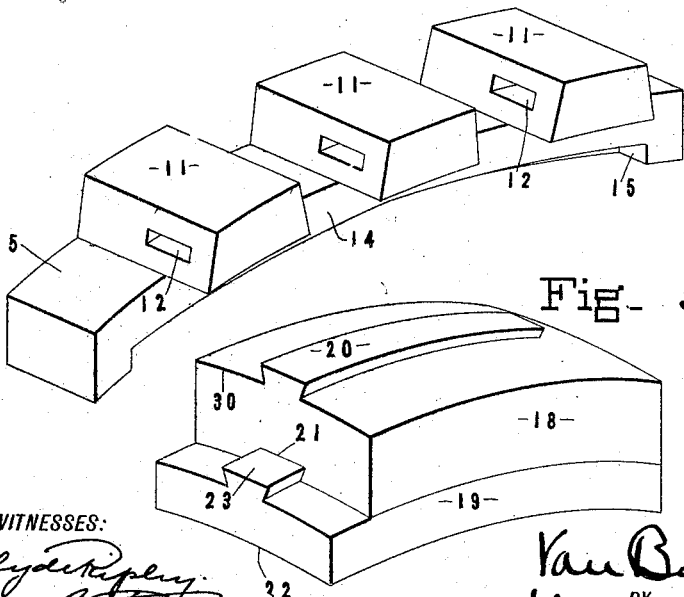
Fig. 5.
Fig. 6.
WITNESSES:
INVENTOR
BY
ATTORNEYS.

UNITED STATES PATENT OFFICE.

VAN BUREN LAMB, OF NEW HAVEN, CONNECTICUT, ASSIGNOR TO KEYSTONE BRAKE SHOE COMPANY, OF NEW YORK, N. Y., A CORPORATION OF NEW YORK.

BRAKE.

No. 850,436.

Specification of Letters Patent.

Patented April 16, 1907.

Application filed May 26, 1906. Serial No. 318,808.

*To all whom it may concern:*

Be it known that I, VAN BUREN LAMB, residing at New Haven, in the county of New Haven and State of Connecticut, have invented certain new and useful Improvements in Brakes, of which the following is a full, clear, and exact description, such as will enable others skilled in the art to which it appertains to make and use the same.

This invention relates to brakes.

One of the objects thereof is to provide braking means of highly efficient and reliable action and simple and durable construction.

Other objects will be in part obvious and in part pointed out hereinafter.

The invention, accordingly consists in the features of construction, combinations of elements, and arrangement of parts, which will be exemplified in the construction hereinafter set forth, and the scope of the application of which will be indicated in the following claims.

In the accompanying drawings, wherein is shown one of the various possible embodiments of this invention, Figure 1 is a side elevation thereof. Fig. 2 is a rear view of a portion of the head. Fig. 3 is a similar view of another portion of the head. Fig. 4 is a perspective view of the parts shown in Fig. 2. Fig. 5 is a similar view of the parts shown in Fig. 3. Fig. 6 is a similar view of a portion of a composite type of shoe adapted for use with this head.

Similar reference characters refer to similar parts throughout the several views of the drawings.

As tending to render clearer one of the dominant aims of this invention it may be noted that the stresses brought to bear upon the parts of brake shoes and heads in the course of hard practical use are extremely severe, and yet the shoes must be in general so mounted as to be removable from the heads, as in case of renewal. If it be attempted to provide a construction to permit this removal by means of bolts or even keys, upon which direct stresses are brought to bear, it is found that these parts in themselves are not thoroughly dependable.

This invention deals with the provision of an interfitting construction such as will bring all the principal stresses directly upon the parts of the shoe and head and of such simple form as to be readily assembled and of low cost of manufacture.

Referring now to the accompanying drawings, there is shown in Fig. 1 a brake-head 1, adapted to be mounted upon the brake-beam, as by means of flange 2, provided with bolt-holes 3. Head 1 is formed in this embodiment of the invention of two portions 4 and 5, which are herein referred to as the "main" and "auxiliary" portion, respectively. Portion 4 comprises a series of projections 6, extending forwardly toward the shoe and provided with registering keyways 7 for a purpose hereinafer described. Extending beneath these projections upon one side of the shoe is an abutment 8, the forward surface, having reference by the term "forward" to a direction toward the wearing-face of the shoe, of this abutment being provided with a mortise or recess 9, the lateral wall of which is undercut, as shown at 10. This recess, moreover, is of varying depth, having a decreasing depth toward its ends. The lateral wall of the recess, moreover, is inclined toward the longitudinal axis of the head for a purpose hereinafter described.

Portion 5 of the head 1 is provided with a number of projections 11, adapted to fit between the projections 6 above referred to, the meeting surfaces of these parts being preferably of converging form in a rearward direction, as is best shown in Fig. 1 of the drawings. Projections 11 are, moreover, provided with keyways 12, adapted upon being fitted between the projections 6 and over the abutment 8 to register with the keyways 7 and permit the insertion of a tapering key 13. Portion 5, moreover, is provided with a surface 14, adapted with the parts in assembled condition, as immediately above described, to abut against the abutment 8 of portion 4, and also has formed upon its forward surface a recess 15, having an undercut lateral wall 16 and adapted when assembled to form, in conjunction with recess 9, a mortise 17, the lateral walls of which converge toward the ends of the shoe and the depth of which decreases in these directions.

The shoe preferably used with the above head is of a composite or double form, comprising the shoe members 18 and 19. Member 18 is provided with a tenon or projection 20 of such conformation as to fit the mortise 17 above described and is provided upon its forward face with a corresponding mortise 21. Shoe 19, which is substantially identical with shoe 18 immediately above described, is herein shown as worn to a smooth surface 22 upon its forward face, but retains its tenon 23, fitting the mortise 21. It will thus be seen that upon the shoe 19 becoming entirely worn away and the shoe 18 worn to any desired degree the latter shoe may be removed from the head, a new shoe of the same general form fitted upon its tenon 20, and the corresponding tenon of the new shoe fitted within the mortise 17 of the head. In this manner the shoes may be entirely consumed and all waste of metal done away with.

The fitting of the shoes one upon another is brought about by dividing the same transversely into two parts, as the parts 24 and 25 of shoe 18 and 26 and 27 of shoe 19. These parts are then assembled by slipping the parts 24 and 25, respectively, over each end of the tenon 23 and thereupon inserting the tenon 20 in the mortise 17 and assembling the head as above described. The lines of division of the several shoes are preferably offset one from another, as shown at 28 and 29, in order to avoid a continuous line of division, to increase the strength of the shoe, and attain other desirable features. In the preferred embodiment of this invention, moreover, the shoes are curved in a transverse direction, as shown at 30, thus insuring the entire wearing away of each shoe prior to any abrasion of the tenon and doing away with the chance of dropping any fragments upon the road-bed.

The method of use of the above-described embodiment of this invention has already been to some extent set forth, and it will be necessary merely to note that upon the outer or forward shoe being entirely worn away and the second shoe partially consumed the key 13 is removed, permitting the lateral separation of the parts of the head and a new shoe slipped over the ends of the worn member and replaced within the mortise 17, the parts of the head being reassembled, as described. It will thus be seen that there is provided a simple and inexpensive device in which the several objects of this invention are achieved and the above-noted advantages, among others, are attained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new, and desire to secure by Letters Patent, is—

1. In brake construction, in combination, a brake-shoe having a rearwardly-projecting portion provided with undercut side walls converging toward each end of the shoe, a head comprising a pair of laterally-separable portions each of which engages one of said side walls, and means adapted to hold the portions of said head in assembled condition.

2. In brake construction, in combination, a brake-shoe having a rearwardly-projecting portion provided with undercut side walls converging toward each end of the shoe, a head comprising a pair of laterally-separable portions each of which is adapted to fit one of said side walls, and means adapted to hold the portions of said head in assembled condition.

3. In brake construction, in combination, a brake-shoe having a rearwardly-projecting portion provided with undercut side walls converging toward each end of the shoe, a head comprising a pair of laterally-separable portions each of which is adapted to fit one of said side walls, the portions of said head being provided with laterally-extending intermeshing projections, and means adapted to hold the portions of said head in assembled condition.

4. In brake construction, in combination, a brake-shoe having a rearwardly-projecting portion provided with undercut side walls converging toward each end of the shoe, a head comprising a pair of laterally-separable portions each of which is adapted to fit one of said side walls substantially throughout the entire length thereof, and means adapted to hold the portions of said head in assembled condition.

5. In brake construction, in combination, a brake-shoe having a rearwardly-projecting portion provided with undercut side walls converging toward each end of the shoe, a head comprising a pair of laterally-separable portions each of which is adapted to fit one of said side walls adjacent each end thereof, and means adapted to hold the portions of said head in assembled condition.

6. In brake construction, in combination, a brake-shoe having a rearwardly-projecting portion provided with undercut side walls converging toward each end of the shoe, a head comprising a pair of laterally-separable portions each of which is adapted to fit one of said side walls adjacent each end thereof, said head being provided with intermeshing projections, and means adapted to hold the portions of said head in assembled condition.

7. In brake construction, in combination, a brake-shoe having a rearwardly-projecting portion provided with undercut side walls converging toward each end of the shoe, a head comprising a pair of laterally-separable portions each of which is adapted to fit one of said side walls adjacent each end thereof, said head being provided with intermeshing projections, and a key passing through said projections and adapted to hold the portions of said head in assembled condition.

8. In brake construction, in combination, a brake-shoe having a rearwardly-projecting portion of decreasing thickness toward the ends of the shoe and provided with undercut side walls converging toward each end of the shoe, a head comprising a pair of laterally-separable portions each of which is adapted to fit one of said side walls, and means adapted to hold the portions of said head in assembled condition.

9. In brake construction, in combination, a brake-shoe having a rearwardly-projecting portion of decreasing thickness toward the ends of the shoe and provided with undercut side walls converging toward each end of the shoe, a head comprising a pair of laterally-separable portions each of which is adapted to fit one of said side walls, the portions of said head being provided with laterally-extending intermeshing projections, and means adapted to hold the portions of said head in assembled condition.

10. In brake construction, in combination, a brake-shoe having a rearwardly-projecting portion of decreasing thickness toward the ends of the shoe and provided with undercut side walls converging toward each end of the shoe, a head comprising a pair of laterally-separable portions each of which is adapted to fit one of said side walls adjacent each end thereof, and means adapted to hold the portions of said head in assembled condition.

11. In brake construction, in combination, a brake-shoe having a rearwardly-projecting portion provided with undercut side walls converging toward the end of the shoe, a second shoe adapted to fit about said projecting portion and having upon its rear surface a similar projecting portion, a head comprising a pair of laterally-separable portions each of which is adapted to fit one of the side walls of the projecting portion of said second shoe adjacent each end thereof, and means adapted to hold the portions of said head in assembled condition.

12. In brake construction, in combination, a brake-shoe having a rearwardly-projecting portion provided with undercut side walls converging toward each end of the shoe, a second brake-shoe fitted about said projecting portion and provided with a similar projecting portion upon its rear surface, a brake-head comprising a pair of laterally-separable portions each of which is adapted to fit one of the side walls of the projecting portion of said second shoe adjacent each end thereof, said portions of said head being provided with laterally-extending projections adapted to intermesh one with another, and a key passing through said projections and holding said portions of said head in assembled condition.

13. In brake construction, in combination, a brake-shoe having a rearwardly-projecting portion provided with undercut side walls, a brake-head comprising a pair of laterally-separable portions each of which is adapted to fit one of said side walls adjacent each end thereof, the portions of said head being provided with laterally-extending intermeshing projections, and means adapted to hold the portions of said head in assembled condition.

14. In brake construction, in combination, a brake-shoe having a rearwardly-projecting portion provided with undercut side walls, a brake-head comprising a pair of laterally-separable portions each of which is adapted to fit one of said side walls adjacent each end thereof, the portions of said head being provided with laterally-extending intermeshing projections, and a key passing through said intermeshing projections and adapted to hold the portions of said head in assembled condition.

15. In brake construction, in combination, a brake-shoe having a rearwardly-extending projecting portion provided with undercut side walls, a brake-head comprising a main portion and a laterally-separable auxiliary portion, said portions of said head being adapted respectively to fit said undercut side walls adjacent each end thereof and said main portion being provided with a plurality of recesses, laterally-extending intermeshing projections respectively formed upon said main and said auxiliary portions, said projections upon said auxiliary portions being adapted to fit within said recesses upon said main portion, and means adapted to hold said portions of said head in assembled condition.

16. In brake construction, in combination, a brake-shoe having a rearwardly-extending projecting portion provided with undercut side walls, a brake-head comprising a main portion and a laterally-separable auxiliary portion, said portions of said head being adapted respectively to fit said undercut side walls adjacent each end thereof and said main portion being provided with a plurality of recesses, laterally-extending intermeshing projections formed upon said main portion and upon said auxiliary portion, an abutment formed upon said main portion, said projections upon said auxiliary portion being adapted to rest upon said abutment and within said recesses, and means adapted to hold the portions of said head in assembled condition.

17. In brake construction, in combination, a brake-shoe having a rearwardly-extending projecting portion provided with undercut side walls, a brake-head comprising a main portion and a laterally-separable auxiliary portion, said portions of said head being adapted respectively to fit said undercut side walls adjacent each end thereof and said main portion being provided with a plurality of recesses, laterally-extending intermeshing projections formed upon said main portion and upon said auxiliary portion, an abutment formed upon said main portion, said projections upon said auxiliary portion being adapted to rest upon said abutment and within said recesses, an abutting surface formed upon said auxiliary portion adapted to rest against said abutment, and means adapted to hold said portions in assembled condition.

18. In brake construction, in combination, a brake-shoe having a rearwardly-extending projecting portion of decreasing thickness toward the ends of the shoe and provided with undercut side walls, a brake-head comprising a main portion and a laterally-separable auxiliary portion, said portions of said head being adapted respectively to fit said undercut side walls adjacent each end thereof and said main portion being provided with a plurality of recesses, laterally-extending intermeshing projections formed upon said main portion and upon said auxiliary portion, an abutment formed upon said main portion, said projections upon said auxiliary portion being adapted to rest upon said abutment and within said recesses, an abutting surface formed upon said auxiliary portion adapted to rest against said abutment, and means adapted to hold said portions in assembled condition.

19. In brake construction, in combination, a brake-shoe having a rearwardly-projecting portion provided with undercut side walls, a second brake-shoe fitted about said projecting portion and provided upon its rear surface with a similar projecting portion, a brake-head comprising a pair of laterally-separable portions each of which is adapted to fit the side walls of the projection upon said second shoe adjacent each end thereof, and means adapted to hold the portions of said head in assembled condition.

20. In brake construction, in combination, a brake-shoe having a rearwardly-projecting portion provided with undercut side walls, a second brake-shoe fitted about said projecting portion and provided upon its rear surface with a similar projecting portion, a brake-head comprising a pair of laterally-separable portions each of which is adapted to fit the side walls of the projection upon said second shoe adjacent each end thereof, laterally-extending intermeshing projections respectively formed upon the portions of said head, and a key passing through said intermeshing projections and adapted to hold the portions of said head in assembled condition.

21. In brake construction, in combination, a brake-shoe having a rearwardly-projecting portion provided with undercut side walls, a second brake-shoe fitted about said projecting portion and provided upon its rear surface with a similar projecting portion, a brake-head comprising a pair of laterally-separable portions each of which is adapted to fit the side walls of the projection upon said second shoe adjacent each end thereof, laterally-extending intermeshing projections formed upon the portions of said head, an abutment formed upon one portion of said head over which the projections upon the other portion thereof rest, said latter portion being provided with an abutting surface adapted to rest against said abutment, and a key passing through said projections upon said head and adapted to hold the portions of said head in assembled condition.

22. In brake construction, in combination, a brake-shoe having a rearwardly-extending projecting portion provided with undercut side walls converging toward each end of the shoe, a brake-head comprising a main portion and a laterally-separable auxiliary portion, said portions of said head being adapted respectively to fit said undercut side walls adjacent each end thereof and said main portion being provided with a plurality of recesses, laterally-extending intermeshing projections formed upon said main portion and upon said auxiliary portion, an abutment formed upon said main portion, said projections upon said auxiliary portion being adapted to rest upon said abutment and within said recesses, and means adapted to hold the portions of said head in assembled condition.

23. In brake construction, in combination, a brake-shoe having a rearwardly-extending projecting portion provided with undercut side walls converging toward each end of the shoe, a brake-head comprising a main portion and a laterally-separable auxiliary portion, said portions of said head being adapted respectively to fit said undercut side walls adjacent each end thereof and said main portion being provided with a plurality of recesses, laterally-extending intermeshing projections formed upon said main portion and upon said auxiliary portion, an abutment formed upon said main portion, said projections upon said auxiliary portion being adapted to rest upon said abutment and within said recesses, an abutting surface formed upon said auxiliary portion adapted to rest against said abutment, and means adapted to hold said portions in assembled condition.

24. In brake construction, in combination, a brake-shoe, a brake-head, one of said members having a projecting portion provided with undercut side walls converging toward each end thereof and the other of said members comprising a pair of laterally-separable portions each of which is adapted to fit one of said side walls adjacent each end thereof, and means adapted to hold the portions of said last-mentioned member in assembled condition.

25. In brake construction, in combination, a brake-shoe, a brake-head, one of said members having a projecting portion of decreasing thickness toward its ends and provided with undercut side walls and the other of said members being formed in two laterally-separable portions each of which is adapted to fit one of said side walls adjacent each end thereof, and means adapted to hold the portions of said last-mentioned member in assembled condition.

26. In brake construction, in combination, a brake-shoe, a second brake-shoe having a dovetailed connection therewith, and a brake-head having a dovetailed connection with said second brake-shoe, said members being formed to permit the lateral separation of the parts forming the female member of one of said dovetailed connections.

In testimony whereof I affix my signature in the presence of two witnesses.

VAN BUREN LAMB.

Witnesses:
R. S. BLAIR,
A. G. PREVIN.